United States Patent [19]

Hildebrand et al.

[11] Patent Number: 4,852,638
[45] Date of Patent: Aug. 1, 1989

[54] AIR CONDITIONING AND HEATING UNIT FOR AUTOMOTIVE VEHICLES

[75] Inventors: Reinhard Hildebrand; Friedrich Riedel, both of Redwitz, Fed. Rep. of Germany

[73] Assignee: Siemens Aktiengesellschaft, Berlin and Munich, Fed. Rep. of Germany

[21] Appl. No.: 896,126

[22] Filed: Aug. 12, 1986

[30] Foreign Application Priority Data

Aug. 21, 1985 [DE] Fed. Rep. of Germany ....... 3529940

[51] Int. Cl.$^4$ ............................................. B60H 1/02
[52] U.S. Cl. ........................................ 165/42; 165/43; 237/12.3 B; 237/12.3 A; 98/2.11; 137/513.5
[58] Field of Search .................... 165/42, 43, 16, 103; 237/12.3 B, 12.3 A; 98/2.11, 121.2; 137/513.5; 251/298; 236/13

[56] References Cited

U.S. PATENT DOCUMENTS

| | | | |
|---|---|---|---|
| 2,216,420 | 10/1940 | Rose | 98/121.2 |
| 2,828,110 | 3/1958 | Baker et al. | 236/13 |
| 2,884,228 | 4/1959 | Jorgensen | 165/103 |
| 3,318,225 | 5/1967 | May | 236/13 |
| 3,735,809 | 5/1973 | Matsushima | 165/103 |
| 3,948,312 | 4/1976 | Nisbet | 165/42 |
| 4,125,150 | 11/1978 | Zelger et al. | 165/42 |
| 4,289,195 | 9/1981 | Bellot et al. | 165/16 |
| 4,350,289 | 9/1982 | Shimada et al. | 165/16 |
| 4,356,965 | 11/1982 | Matsushima et al. | 165/43 |
| 4,383,642 | 5/1983 | Sumikawa et al. | 165/42 |
| 4,390,124 | 6/1983 | Nilsson | 237/12.3 A |
| 4,592,535 | 6/1986 | Magill et al. | 251/298 |
| 4,610,197 | 9/1986 | Van Becelaere | 98/121.2 |
| 4,615,262 | 10/1986 | Taniguchi | 237/12.3 A |
| 4,653,689 | 3/1987 | Sakurai et al. | 165/42 |

FOREIGN PATENT DOCUMENTS

| | | | |
|---|---|---|---|
| 0102611 | 3/1984 | European Pat. Off. | |
| 0136674 | 4/1985 | European Pat. Off. | 165/42 |
| 3107324 | 2/1981 | Fed. Rep. of Germany | |
| 3039148 | 4/1981 | Fed. Rep. of Germany | |
| 3217825 | 11/1983 | Fed. Rep. of Germany | 165/43 |
| 3300737 | 7/1984 | Fed. Rep. of Germany | |
| 3302377 | 7/1984 | Fed. Rep. of Germany | |
| 3347304 | 8/1984 | Fed. Rep. of Germany | |
| 5474608 | 1/1981 | Japan | |

Primary Examiner—John Ford
Attorney, Agent, or Firm—Kenyon & Kenyon

[57] ABSTRACT

An air conditioning and heating unit for automotive vehicles includes a blower, an evaporator and a heat exchanger disposed in a synthetic resin housing providing with integral air discharge outlets for the headroom, footroom and center plane of a passenger compartment and for windshield defrosting. The evaporator and the heat exchanger are arranged relative to one another so that the paths of the hot air and of the cold air from the blower to inlet openings of the various air discharge outlets are the same and so that the path of the hot air from the evaporator to the inlet openings is 1.3 to 1.8 times longer than the path of the cold air from the evaporator to the air outlet ducts. The inlet openings of the air outlet ducts emanate from a common chamber in the housing.

1 Claim, 3 Drawing Sheets

AIR CONDITIONING AND HEATING UNIT FOR AUTOMOTIVE VEHICLES

BACKGROUND OF THE INVENTION

This invention relates to an air-conditioning and heating unit for automotive vehicles.

Conventional air conditioning and heating units include a blower, an evaporator, a heat exchanger, air mixing flaps and air distribution flaps all disposed within a synthetic resin housing. The air mixing flaps and air distribution flaps serve to guide the air into desired discharge channels, i.e., into a center plane, a headroom plane, a footroom plane and a defroster.

Many such air conditioning and heating units in automotive vehicles are provided with additional throttles, as described in U.S. Pat. No. 4,549,692, as well as air guiding elements and flow stabilizers, in order to maintain the same air volume distribution and the same air discharge temperatures in the air outlet openings of the air conditioning and heating unit.

In such air conditioning and heating units, production of the housings is very expensive and the installation of the additional elements required is often difficult. Moreover, each unit produced is suitable for one type of vehicle only, while the additional elements frequently lead to undesired noise levels.

An object of the present invention is to provide an improved air conditioning and heating unit of the above-described type.

Another object of the present invention is to provide such an improved air conditioning and heating unit which is easy and inexpensive to manufacture.

A further object of the present invention is to provide such an air conditioning and heating unit which may be installed in more than one type of vehicle.

Yet another object of the present invention is to provide such an air conditioning and heating unit which is relatively quiet during operation.

Another, more particular, object of the present invention is to provide such an air conditioning and heating unit wherein the same air temperatures and the same air volumes are obtained in all inlet openings of various air discharge outlets or ducts, regardless of dimensions and without the use of air guidance elements.

SUMMARY OF THE INVENTION

In accordance with the present invention, an air conditioning and heating unit for automotive vehicles comprises a housing of synthetic resin material, a blower, an evaporator, a heat exchanger, a plurality of movable air guidance flaps, and a plurality of air outlet ducts. The blower, the evaporator, the heat exchanger, and the air guidance or air mixing flaps are all disposed in the housing, the evaporator and the heat exchanger communicating with the blower. The air guidance or air mixing flap serve to mix and distribute the air. The air outlet ducts are connected to the housing and each duct has a respective inlet opening. The heat exchanger is disposed substantially transverse to the evaporator and a mixing chamber is located approximately centrally above the evaporator and the heat exchanger. Hot air paths from the blower to the inlet openings of the ducts have substantially the same length and so that cold air paths from the blower to the duct inlet openings are substantially the same length, whereby flow resistances over the hot air paths are substantially the same and whereby flow resistances over the cold air paths are substantially the same. In addition, a hot air path from the evaporator to the duct inlet openings is 1.3 to 1.8, and preferably 1.5, times longer than a cold air path from the evaporator to the duct inlet openings.

The mixing chamber has a common inlet opening for cold air and hot air. A second air mixing flap is associated with the common inlet opening. This flap controls the inflow of cold air as well as hot air and is coupled to a first air mixing flap. In the mixing chamber a discharge opening to the center nozzle is arranged between two discharge openings to defroster nozzles. The second air mixing flap is subdivided into three flap sections of which the center one is arranged radially displaced with respect to the two outside ones.

In an air conditioning and heating unit in accordance with the present invention, a uniform and tempered air flow with relatively little temperature layering is conveyed through all inlet openings of the various air discharge outlets or nipples. No icing of the evaporator occurs, nor is a drop catcher screen required.

A particular advantage of an air conditioning and heating unit in accordance with the present invention is that it can be used for left-hand as well as right-hand drive vehicles. Yet another advantage is that temperature may be either air controlled or water controlled.

Pursuant to further particular features of the present invention, at least two of the air guidance flaps are mechanically coupled to one another, while the duct inlet openings open into a common chamber in the housing. This chamber may be divided into headroom, footroom, center and defroster levels corresponding to respective levels of air outlets into a passenger compartment of a vehicle.

DETAILED DESCRIPTION

Figure 1:
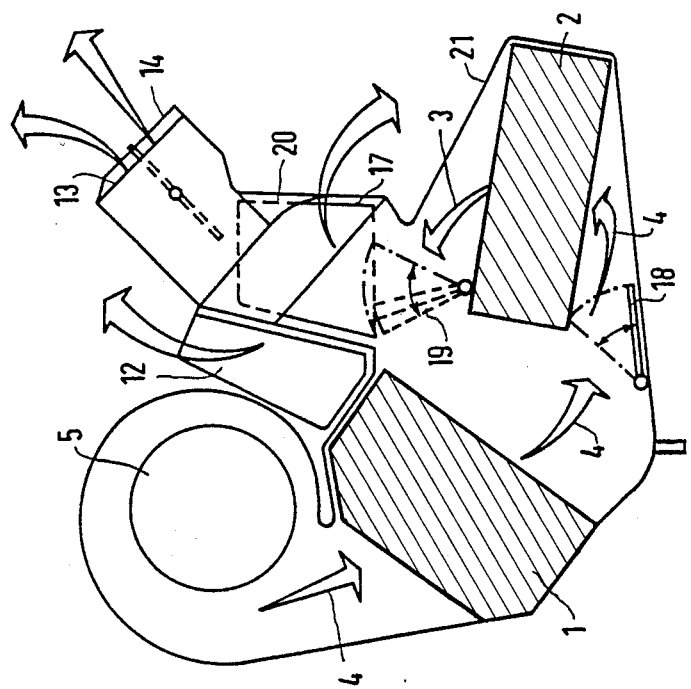
FIG. 1 is a schematic cross-sectional view of an air conditioning and heating unit in accordance with the invention.
Figure 2:
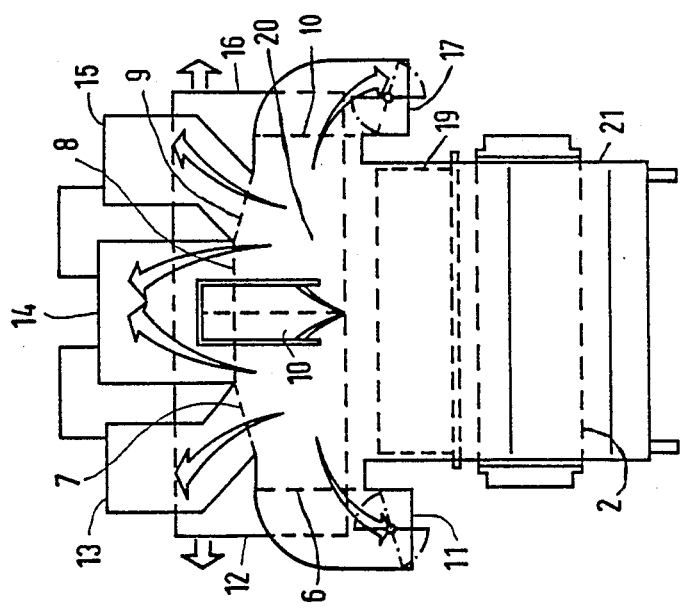
FIG. 2 is a side elevational view of the air conditioning and heating unit of FIG. 1, showing one common chamber for inlet openings of a multiplicity of air discharge outlets or ducts.

As illustrated in FIG. 1, a heating and air conditioning unit with air temperature control comprises an evaporator 1, a heat exchanger 2 and a blower 5 all disposed in a housing 21 of synthetic resin material. Blower 5 supplies cold air 4, i.e., fresh or circulated air, to evaporator 1. The amount of cold air 4 which flows from evaporator 1 through heat exchanger 2 is determined in part by a pair of air mixing or distribution flaps 18 and 19 disposed upstream and downstream of heat exchanger 2, respectively. Air mixing flaps 18 and 19 are pivotably secured to housing 21 and are mechanically coupled to one another. In the positions of air mixing flaps 18 and 19 illustrated in FIG. 1, the entire cold air volume passes through heat exchanger 2, which is connected to a heat source (not illustrated).

Hot air 3 from heat exchanger 2 flow directly into a common chamber 20 which communicates with inlet openings 6, 7, 8, 9 and 10 of respective air discharge ducts or outlet nipples 11 and 17 connectable to footroom nozzles (not shown), air discharge ducts 12 and 16 connectable to outside nozzles (not shown), air discharge ducts 13 and 15 connectable to defroster nozzles (not shown), and a discharge duct 14 connectable to a center nozzle (not shown) in a passenger compartment of an automotive vehicle. It is to be noted that air inlet openings 6, 7, 8, 9, and 10 are provided in housing 21.

Figure 3:
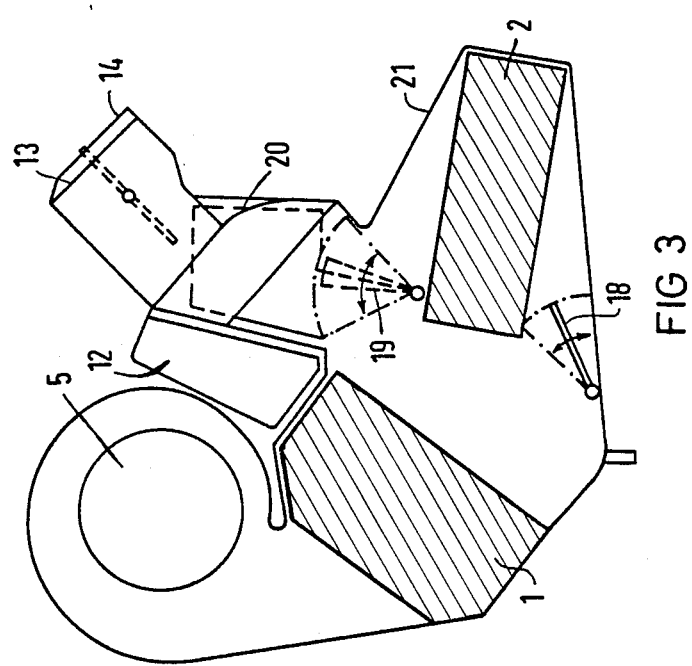
FIG. 3 is a schematic cross-sectional view similar to FIG. 1, showing an air mixing flap comprised of several sections.
Figure 5:
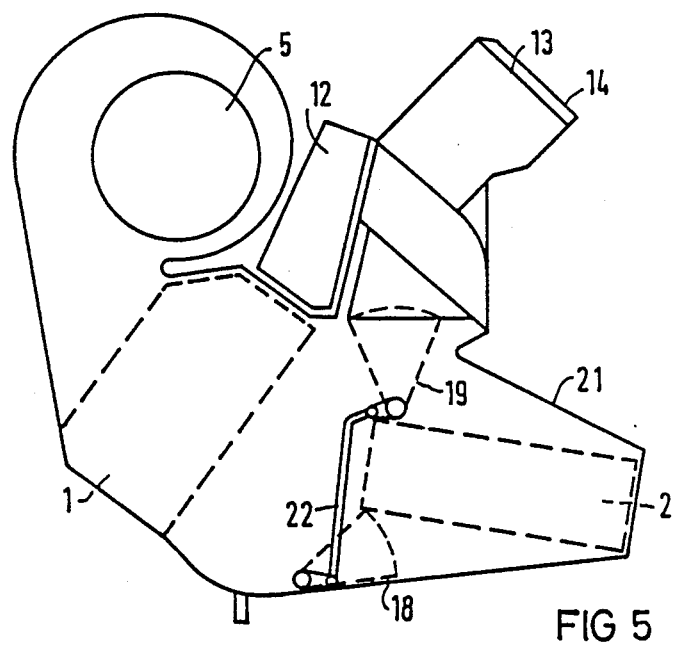
FIG. 5 shows a lateral view of the embodiment of FIG. 1 with an illustration of the coupling between the first and second air mixing.

It is, of course, possible to set air mixing flaps 18 and 19 to intermediate positions, whereby the temperature of the air supplied to inlet openings 6–10 of air discharge outlets or ducts 11–17 can be varied. FIG. 3 illustrates the air mixing flaps in center positions.

The cold air and/or the hot air that exits from the heat exchanger flows directly into the mixing chamber 20 via a common inlet opening arranged approximately centrally above the evaporator 1 and the heat exchanger 2. The mixing chamber is provided with inlet openings 6, 7, 8, 9 and 10 which lead to air discharge nipples for the foot room nozzles 11 and 17, for the outside nozzles 12 and 16, for the defroster nozzles 13 and 15 and for the center nozzle 14. The inlet opening 8 for the center nozzle is arranged between the inlet openings 7 and 9 for the defroster nozzles 13 and 15.

Figure 4:
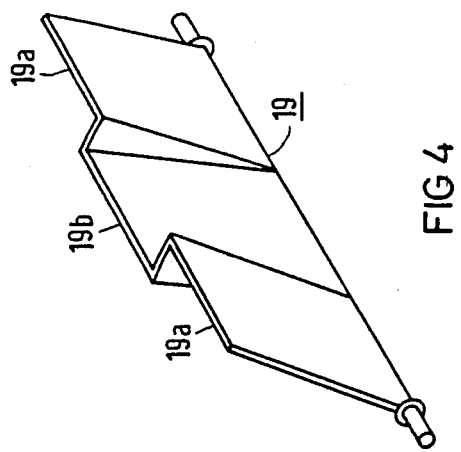
FIG. 4 is an isometric view of the air mixing flap shown in FIG. 3.

As illustrated in FIGS. 3 and 4, a particularly advantageous embodiment of the invention includes an air mixing flap 19 divided into two flap end sections 19a and a flap center section 19b, end sections 19a being disposed in a common plane angularly staggered with respect to a plane defined by center flap section 19b. The flap illustrated in FIGS. 3 and 4 enables different temperatures to be obtained in the inlet openings for the various air outlet stages especially for the center level and the defroster level.

Although the invention has been described in terms of particular embodiments and modifications, one of ordinary skill in the art, in light of this teaching, can generate additional embodiments and modifications without departing from the spirit of or exceeding the scope of the claimed invention. Accordingly, it is to be understood that the descriptions and illustrations herein are proffered by way of example to facilitate comprehension of the invention and should not be construed to limit the scope thereof.

What is claimed is:

1. An air conditioning and heating unit for an automotive vehicle, comprising:
    a housing of synthetic resin material;
    a blower disposed in said housing;
    an evaporator disposed in said housing and communicating with said blower;
    a heat exchanger disposed in said housing and communicating with said blower;
    a mixing chamber having a common inlet opening for receiving hot air and cold air and a plurality of inlet openings for individual air discharge nipples for defroster level, outside level, center level and foot room level of a passenger compartment in the vehicle;
    a first air mixing flap at an inlet to the heat exchanger;
    a second air mixing flap, associated with said common inlet opening and coupled to said first air mixing flap, controlling the inflow of cold air and hot air into said mixing chamber;
    wherein said heat exchanger is disposed substantially transverse to said evaporator;
    wherein said mixing chamber is disposed above a region between said evaporator and said heat exchanger;
    wherein a discharge opening to a center level nozzle is arranged between two discharge openings to two defroster nozzles; and
    wherein said second air mixing flap is subdivided into three flap sections, of which a center section is arranged radially displaced with respect to two outside sections.

* * * * *